(12) United States Patent
Bonin et al.

(10) Patent No.: US 7,609,488 B2
(45) Date of Patent: Oct. 27, 2009

(54) FLY HEIGHT ACTUATOR/VOID REGION IN BASECOAT

(75) Inventors: Wayne A. Bonin, North Oaks, MN (US); Michael T. Johnson, Minneapolis, MN (US); Dion Song, Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 372 days.

(21) Appl. No.: 11/585,584

(22) Filed: Oct. 24, 2006

(65) Prior Publication Data

US 2008/0094749 A1 Apr. 24, 2008

(51) Int. Cl.
G11B 5/39 (2006.01)
G11B 5/187 (2006.01)

(52) U.S. Cl. .................. 360/317; 360/110; 360/122; 360/125.74

(58) Field of Classification Search ................ 360/317, 360/294.7, 110, 122, 125.71, 125.74
See application file for complete search history.

(56) References Cited

U.S. PATENT DOCUMENTS

| | | | |
|---|---|---|---|
| 6,515,825 B1 * | 2/2003 | Sato ................. 360/125.43 |
| 6,683,757 B1 | 1/2004 | Bonin et al. |
| 6,697,232 B1 | 2/2004 | Hipwell, Jr. et al. |
| 6,785,086 B1 | 8/2004 | Bonin et al. |
| 6,798,616 B1 * | 9/2004 | Seagle et al. ........... 360/125.65 |
| 6,836,389 B2 | 12/2004 | Macken et al. |
| 6,859,346 B1 | 2/2005 | Meyer |
| 7,262,503 B2 * | 8/2007 | Juengling et al. ........... 257/758 |
| 2002/0176206 A1 * | 11/2002 | Sato ......................... 360/126 |
| 2003/0099054 A1 | 5/2003 | Kamijima |
| 2003/0161071 A1 | 8/2003 | Bonin et al. |
| 2003/0218831 A1 * | 11/2003 | Krause et al. ............... 360/123 |
| 2005/0122630 A1 | 6/2005 | Hipwell, Jr. et al. |
| 2005/0264912 A1 * | 12/2005 | Nikitin et al. ................ 360/75 |
| 2006/0090329 A1 * | 5/2006 | Kato et al. ............... 29/603.01 |

* cited by examiner

Primary Examiner—Jefferson Evans
(74) Attorney, Agent, or Firm—Kinney & Lange, P.A.

(57) ABSTRACT

A transducing device responsive to magnetic fields includes a writer, a reader, an actuator, and a void. The actuator is positioned proximate the writer and reader. The void is positioned between at least one of the reader and writer and a substrate of a sensing device. The void is also positioned proximate an external surface.

20 Claims, 3 Drawing Sheets

_(12) United States Patent_

FLY HEIGHT ACTUATOR/VOID REGION IN BASECOAT

BACKGROUND OF THE INVENTION

The present invention relates generally to a magnetic head that has controlled thermal expansion. In particular, the present invention relates to a magnetic head having an actuator and a void region.

Magnetic data storage and retrieval systems store and retrieve information on magnetic media. In a magnetic data storage and retrieval system, a magnetic head typically includes a writer portion for storing magnetically-encoded information on a magnetic media and a reader portion for retrieving the magnetically-encoded information from the magnetic media. To write data to the magnetic media, an electrical current is caused to flow through a conductive write coil to induce a magnetic field in a write pole. By reversing the direction of the current through the write coil, the polarity of the data written to the magnetic media is also reversed.

The magnetic head is supported relative to a magnetic media surface by a slider. During operation, the disc is rotated by a spindle motor which creates airflow along a storage interface surface (SIS) of the slider from a leading edge to a trailing edge of the slider. Airflow along the SIS of the slider creates a hydrodynamic lifting force so the head of the slider essentially flies above the surface of the magnetic media. The distance between the slider and the magnetic media is known as the fly height.

During operation of the magnetic data storage and retrieval system, the fly height is preferably small enough to allow for writing to and reading from the magnetic media with a large areal density, and great enough to prevent contact between the magnetic media and the magnetic head. Performance of the magnetic head depends primarily upon head-media spacing (HMS). High density recording preferably requires a small HMS and a low fly height. Prior to using each magnetic head, there are small variations in fly height that must be accounted for due to changing operating conditions and head-to-head variations.

Current magnetic head designs use an actuator to heat the transducer and reduce the HMS by controlled thermal expansion of the transducer. The actuator is typically placed close to, or even inside, the writer coil to maximize heating of the writer. For effective operation, the actuator must provide a large enough stroke when the write pole is either close to the magnetic media or only slightly recessed from the point at the storage interface surface where the writer protrudes most. In addition, the fly clearance must be measured for each magnetic head by a controlled measurable non-destructive head-media contact so that the proper algorithm for operating the actuator is used for each magnetic head.

In order to compensate for variations of fly height due to both head-to-head variations and changing operating conditions, the actuator provides adjustments. For applications where power supplies are limited or low power dissipation is required, actuator designs must be efficient enough to provide the needed HMS within the power requirements. These designs must actuate both the reader and the writer in order to achieve optimal efficiency. However, current designs have limited stroke and excessive power requirements due to the actuator being mechanically constrained and thermally heat sunk to the slider by the alumina basecoat.

Further, the differing mechanical and chemical properties of the substrate and transducer layers further affect the SIS during operation of the magnetic head. As the magnetic data storage and retrieval system is operated, the magnetic head is subjected to increasing temperatures within the magnetic data storage and retrieval system. In addition, a temperature of the magnetic head itself, or a part hereof, may be significantly higher than the temperature within the magnetic data storage and retrieval system due to heat dissipation caused by electrical currents in the magnetic head.

The coefficient of thermal expansion (CTE) is a measure of the change in length of a unit length of material for an incremental change in temperature. The CTE of materials used in forming the substrate is typically much smaller that the CTE of materials used in forming the metallic layers of the transducer. Due to the larger CTE of the metallic layer, those layers tend to expand a greater amount than the substrate. Thus, when the transducer is subjected to higher operating temperatures, the metallic layers tend to protrude closer to the magnetic disc than the substrate, affecting the pole tip recession (PTR) of the transducer. This change in PTR caused by temperature is referred to as the Thermal PTR (TPTR). The PTR of a particular layer is defined as the distance between the planar SIS of the substrate and the planar SIS of that layer.

To keep the distance between the transducer and the magnetic media constant, PTR should not change significantly with temperature. If TPTR is large, then the spacing between the transducer and the media will change significantly with temperature, thereby requiring the low-temperature fly height to be high enough to accommodate this variation at higher operating temperatures. Much of the TPTR originates from the metallic layers exposed at the SIS. It is the mismatch in the CTEs between the metallic layers of the transducer and the substrate material (which forms the SIS) that gives rise to the thermal protrusion. Thus, there is a need in the art for a magnetic head design that decouples the metallic layers of the transducer from the substrate.

BRIEF SUMMARY OF THE INVENTION

In one aspect, the invention is a transducing device responsive to magnetic fields and includes a writer, a reader, an actuator, and a void region. The actuator is positioned proximate the writer and reader. The void region is positioned between at least one of the reader and writer and a substrate of a sensing device. The void region is also positioned proximate an external surface.

In another aspect, the invention is a magnetic head including a transducer, a substrate positioned adjacent the transducer, an actuator, and at least one void region. The actuator is positioned proximate the reader. The void region is positioned between the transducer and the substrate and proximate a first external surface of the transducer.

In another aspect, the invention is a transducer positioned adjacent a substrate. The transducer includes a plurality of metallic layers, an actuator, and a void region. The void region is positioned between at least one of the plurality of metallic layers and the substrate.

DETAILED DESCRIPTION

Figure 1A:
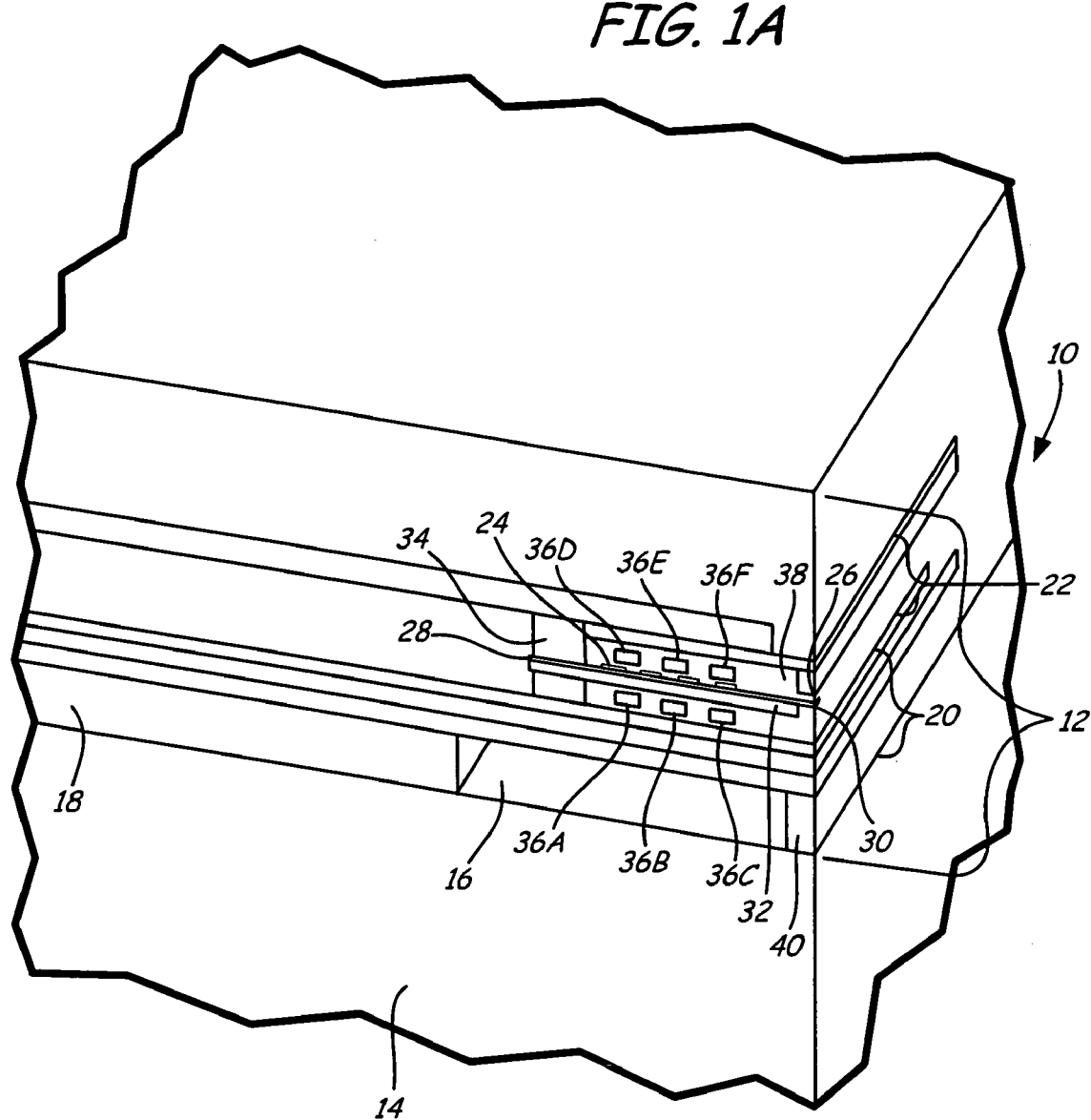
FIG. 1A is a sectional view of a first embodiment of a magnetic head having a void region prior to heating.
Figure 1B:
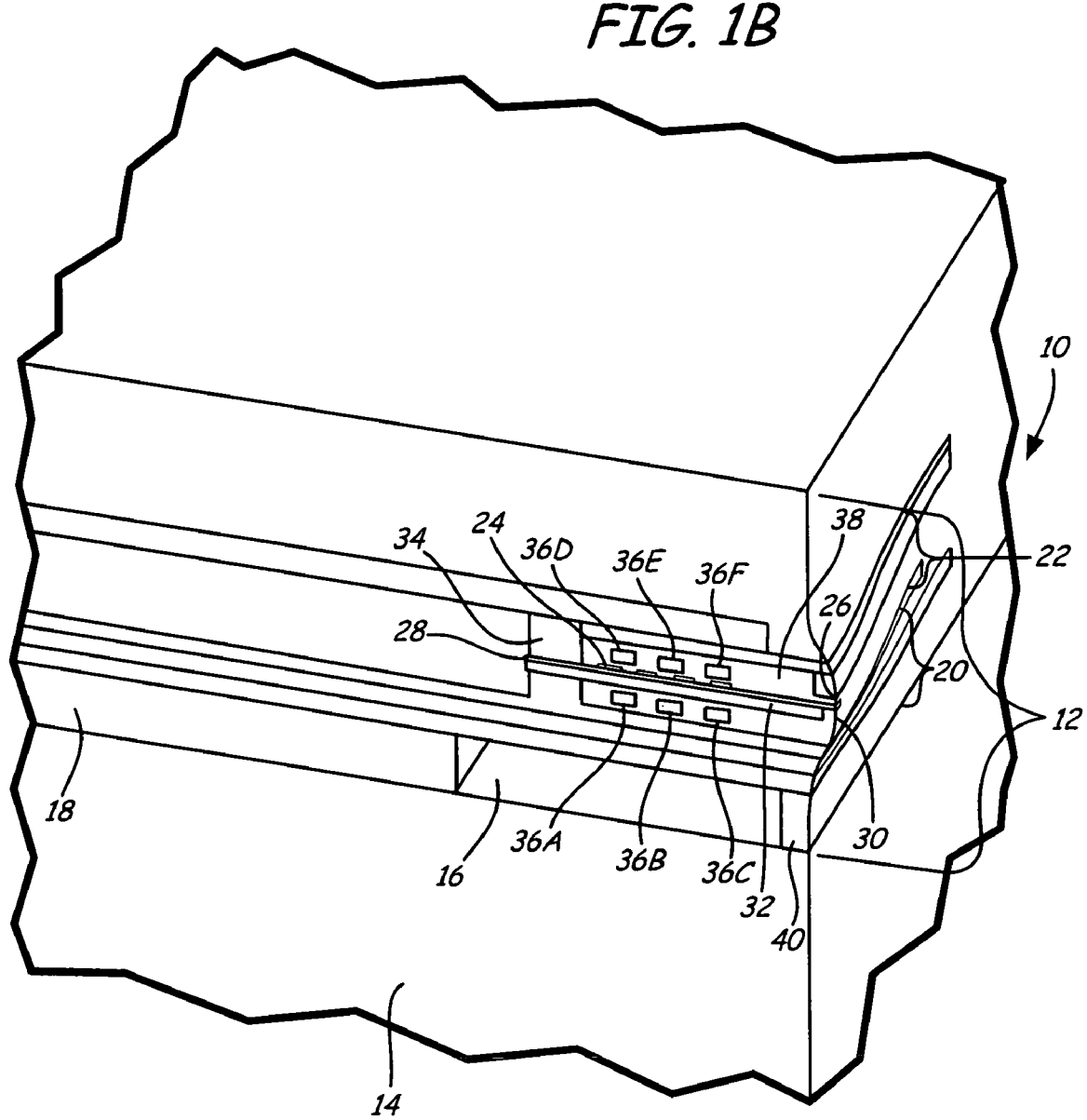
FIG. 1B is a sectional view of the first embodiment of the magnetic head after heating with a localized actuator.

FIGS. 1A and 1B are sectional views of magnetic head 10 before and after heating, respectively, and will be discussed in conjunction with one another. Magnetic head generally includes transducer 12, substrate 14, and void region 16. Void region 16 is positioned between transducer 12 and substrate 14 proximate an external surface of transducer 12 and serves to mechanically decouple transducer 12 from substrate 14. The external surface is the surface of transducer 12 that is the first contact point between magnetic head 10 and media M. In some embodiments, the external surface of transducer 12 is a storage interface surface (SIS) or an air-bearing surface (ABS) of transducer 12 relative to media M.

Transducer 12 of magnetic head 10 generally includes basecoat 18, reader 20, writer 22, and actuator 24. Basecoat 18 is formed on substrate 14 and reader 20 and writer 22 is deposited on basecoat 18. Writer 22 generally includes return pole 26, write pole 28, write pole tip 30 located at an end of write pole 28 at the ABS, yoke 32, back via 34, write coil 36 (shown as write coil turns 36A, 36B, 36C, 36D, 36E, and 36F), and insulator 38. Although magnetic head 10 is shown having one return pole 26, writer 22 may have two return poles or no return pole without departing from the intended scope of the invention.

Return pole 26 and write pole 28 extend from the ABS and are connected to each other distal from the ABS at back via 34. Yoke 32 is formed on write pole 28 but does not extend the full length of write pole 28. Insulator 38 separates return pole 26, write pole 28, and write coil 36 from each other. Return pole 26 and yoke 32 are formed from metallic ferromagnetic materials. Preferably, each of these components is formed from an alloy composed primarily of Fe, Ni, and/or Co, which typically has a large CTE.

As shown in FIGS. 1A and 1B, write coil 36 has coil turns 36A, 36B, 36C, 36D, 36E, and 36F. Write coil turns 36A, 36B, 36C, 36D, 36E, and 36F wrap around write pole 28 such that the flow of electrical current through conductive write coil 36 generates a magnetic flux at write pole tip 28. In one configuration, write coil 36 may be wrapped in the following order: 36A to 36D to 36B to 36E to 36C to 36F. Although FIGS. 1A and 1B show write coil 36 wrapped in a helical configuration, other configurations can be used without departing from the scope of the intended invention. Each individual coil turn 36A, 36B, 36C, 36D, 36E, and 36F is separated from one another and from return pole 26 and write pole 28 by insulator 38. Write coil 36 is generally formed from an electrically-conductive metal, such as Cu, Au, or Ag. Most commonly used is Cu, which has a CTE in the range of about $16.0 \times 10^{-6}/°C$ to $18.0 \times 10^{-6}/°C$.

Insulator 38 surrounds write coil 36 and is preferably formed from a dielectric material with high thermal conductivity to facilitate the removal of heat from write coil 36 via return pole 26 and write pole 28. Insulator 38 is preferably formed from $Al_2O_3$ or a photoresist.

Actuator 24 is positioned between write pole 28 and write coil turns 36D, 36E, and 36F and acts as a localized heat source for transducer 12. While actuator 24 heats both reader 20 and writer 22, actuator 24 primarily heats writer 22 to reduce the head-media spacing (HMS) by controlled thermal expansion of transducer 12. As previously mentioned, actuator 24 is typically positioned close to, or even inside, write coil 36 to maximize heating of writer 22.

Void region 16 is formed between transducer 12 and substrate 14 and includes hinge 40 that acts as a lever. Void region 16 is formed by locally removing material between transducer 12 and substrate 14 and serves to locally decouple transducer 12 from substrate 14. Enough material is removed from between transducer 12 and substrate 14 to compensate for thermal protrusion of transducer 12 when heated by actuator 24. In one embodiment, void region 16 has a thickness of between approximately 1 micron and approximately 5 microns. By forming void region 16 between transducer 12 and substrate 14, the region of decoupling is localized to the area of transducer 12 to allow a structurally sound connection of reader 20 and writer 22 to substrate 14. In one embodiment, after the material has been removed, a vacuum or a gas, such as air, replaces the volume of material that is now void region 16.

Void region 16 is formed by first building a sacrificial layer into basecoat 18 of transducer 12. A capping layer is formed over transducer 12 for subsequent generation of the structure of transducer 12. A via may be milled in the capping layer to allow the sacrificial layer to be removed through either acid etching bath or gaseous etch immediately after the capping layer is formed or at a later time, for example, after transducer 12 is built. If an acid etch is used, the sacrificial layer may be copper or some other metal that is dissolved by common chemicals that do not attack basecoat 18 or substrate 14. A possible gaseous etch process can use silicon as the sacrificial layer and $XeF_2$ as the etchant. The resulting basecoat configuration has a lever arm about substrate 14 that allows less constrained actuation. In this embodiment, actuation is provided by using actuator 24 to cause thermal expansion of the sacrificial layer.

The position of void region 16 produces hinge 40 that allows free movement of transducer 12 to produce a decrease in the HMS. The external surface, or SIS, is still solid for proper air-bearing pressurization. The low stiffness of transducer 12, provided by hinge 40, allows actuator 24 and transducer 12 to move more freely than if surrounded by a solid basecoat. For a given actuator power, this results in an increased actuator stroke. The lever arm design does not depend on the actuator design or type and can be incorporated with existing transducer designs. For example, actuator 24 may be, but is not limited to: a thermal actuator, a piezoelectric actuator, or a magnetostrictive actuator.

Void region 16 will have significantly lower thermal conductivity than alumina basecoat 18, decreasing thermal coupling between actuator 24 and substrate 14. The placement of void region 16 can thus be used for thermal management of magnetic head 10 to reduce temperature increases where needed when using a heat-based actuation method. For example, void region 16 can be used to reduce temperature increases near sensitive areas of transducer 12, such as reader 20.

Figure 2:
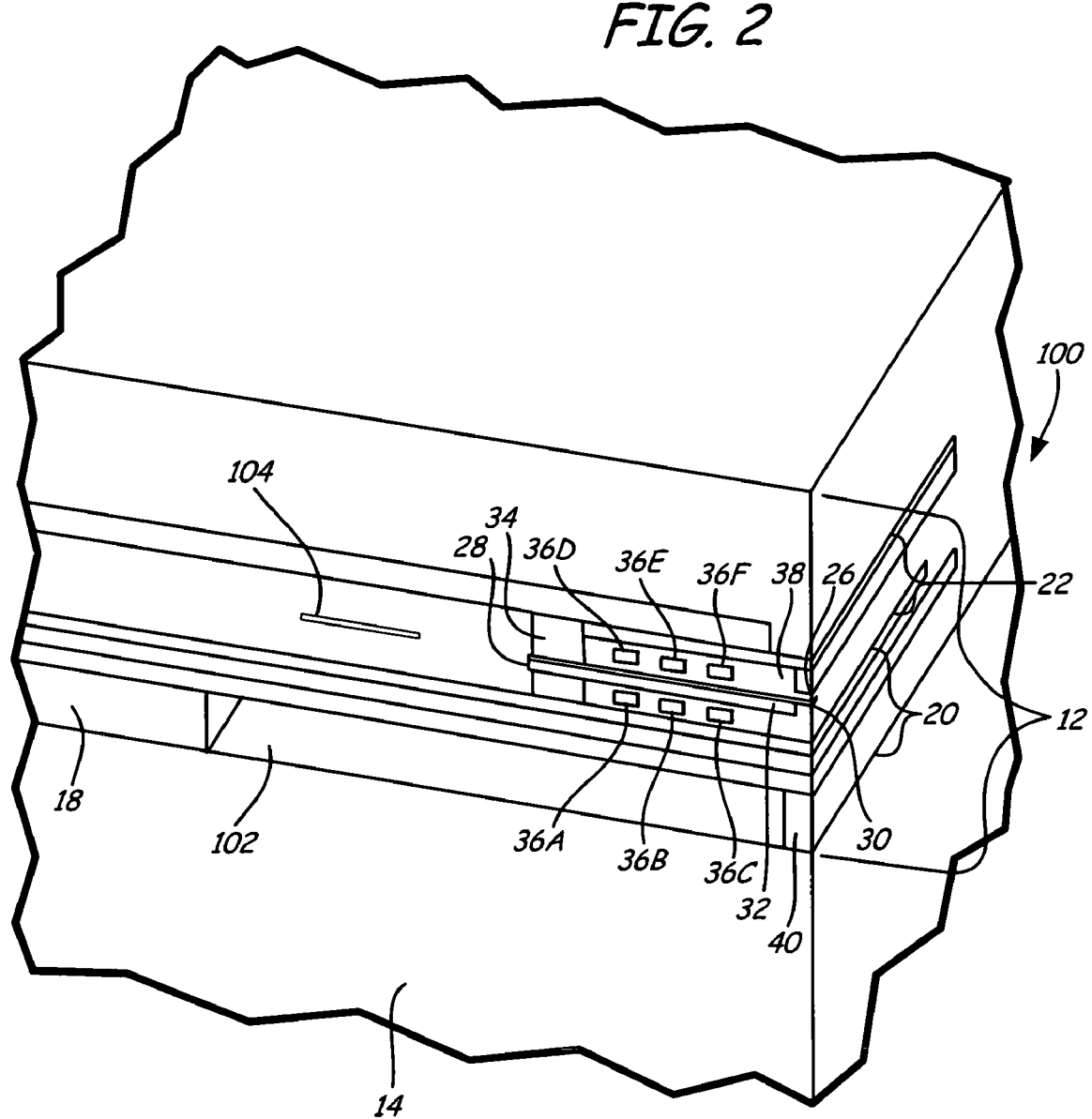
FIG. 2 is a sectional view of a second embodiment of the magnetic head having a void region.

FIG. 2 shows a sectional view of a second embodiment of magnetic head 100 having void region 102. Magnetic head 100 generally includes transducer 12, substrate 14, void region 102, and actuator 104. Transducer 12 of the first embodiment of magnetic head 10 and the second embodiment of magnetic head 100 are the same except that actuator 104 of magnetic head 100 is positioned behind transducer 12, rather than adjacent or internal to transducer 12, as shown and described in the first embodiment of magnetic head 10. Void region 102 of magnetic head 100 functions similarly to void region 16 of magnetic head 10 except that void region 102 extends further back through magnetic head 100 than void region 16 of magnetic head 10 in order to account for the heat generated from actuator 104. Actuator 104 can thus be positioned further away from the external surface, or the SIS, and still achieve substantially the same stroke as when actuator 104 is positioned within transducer 12.

The maximum achievable stroke of a magnetic head is limited by the highest temperature that reader 20 can withstand without being damaged. Because reader 20 and writer 22 are typically positioned in close proximity to one another, when the actuator is located proximate writer 22, this causes a significant increase in the temperature proximate reader 20 as well. By positioning actuator 104 behind both reader 20 and writer 22, the high temperature region emitted from actuator 104 is removed from reader 20, enabling actuator 104 to operate at a higher temperature. This in turn increases the maximum stroke capability of magnetic head 100.

The magnetic head of the present invention comprises a void region for locally decoupling a transducer of a magnetic head from a substrate of the magnetic head proximate the air-bearing surface to control thermal protrusion. An actuator for actuating the transducer is positioned either within or behind the transducer. The void region is formed between the transducer and the substrate and mechanically decouples the reader and writer from the substrate. The void region is positioned proximate the air-bearing surface and creates a lever arm or hinge.

Although the present invention has been described with reference to preferred embodiments, workers skilled in the art will recognize that changes may be made in form and detail without departing from the spirit and scope of the invention.

The invention claimed is:

1. A transducing device responsive to magnetic fields, the transducing device comprising:
   a substrate;
   a writer;
   a reader;
   an actuator positioned proximate the writer and the reader; and
   a void region positioned between at least one of the reader and the writer and the substrate and proximate an external surface.

2. The transducing device of claim 1, wherein the void region contains a vacuum.

3. The transducing device of claim 1, wherein the void region is filled with a gas.

4. The transducing device of claim 1, wherein the actuator is a heater.

5. The transducing device of claim 1, wherein the void region has a thickness of between about 1 micron and about 5 microns.

6. The transducing device of claim 1, wherein the void region mechanically decouples the reader and the writer from the substrate.

7. A magnetic head comprising:
   a transducer;
   a substrate positioned adjacent the transducer;
   an actuator positioned proximate the transducer; and
   at least one void region positioned between the transducer and the substrate and proximate a first external surface of the transducer.

8. The magnetic head of claim 7, wherein the void region contains a vacuum.

9. The magnetic head of claim 7, wherein the void region is filled with a gas.

10. The magnetic head of claim 7, wherein the actuator is positioned behind the transducer.

11. The magnetic head of claim 7, wherein the void region mechanically decouples the transducer from the substrate.

12. The magnetic head of claim 7, wherein the void region has a thickness of between about 1 micron and about 5 microns.

13. A transducer positioned adjacent a substrate, the transducer comprising:
    a plurality of metallic layers;
    an actuator positioned adjacent the substrate; and
    a void region positioned between at least one of the plurality of metallic layers and the substrate.

14. The transducer of claim 13, wherein the void region has a thickness of between about 1 micron and about 5 microns.

15. The transducer of claim 13, wherein the void region is positioned proximate an external surface of the transducer.

16. The transducer of claim 13, wherein the actuator is a heater.

17. The transducer of claim 13, wherein the actuator is selected from the group consisting of: a thermal actuator, a piezoelectric actuator, and a magnetostrictive actuator.

18. The transducer of claim 13, wherein the void region comprises a hinge that acts as a lever for the actuator.

19. The transducer of claim 13, wherein the void region contains a vacuum.

20. The transducer of claim 13, wherein the actuator is positioned behind the plurality of thin film layers.

* * * * *

UNITED STATES PATENT AND TRADEMARK OFFICE
CERTIFICATE OF CORRECTION

PATENT NO.       : 7,609,488 B2
APPLICATION NO. : 11/585584
DATED            : October 27, 2009
INVENTOR(S)      : Bonin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 375 days.

Signed and Sealed this

Twelfth Day of October, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,609,488 B2 |
| APPLICATION NO. | : 11/585584 |
| DATED | : October 27, 2009 |
| INVENTOR(S) | : Wayne A. Bonin, Michael T. Johnson and Dion Song |

It is certified that error appears in the above-identified patent and that said Letters Patent is hereby corrected as shown below:

Col. 5, Line 28 Delete "and"
Col. 5, Line 31 Insert --; and
a hinge positioned between the void region and a first external surface of the transducing device.--

Col. 6, Line 4 Delete "and"
Col. 6, Line 5 Insert --;-- after "and the substrate"
and Delete "proximate a first external surface of the transducer"
and Insert --a hinge positioned between the at least one void region and a first external surface of the transducer.--

Col. 6, Line 23 Delete "and"
Col. 6, Line 25 Insert --; and
a hinge positioned between the void region and a first external surface of the transducer--

Signed and Sealed this
Twelfth Day of April, 2011

David J. Kappos
*Director of the United States Patent and Trademark Office*